June 17, 1924.  R. R. HUGHES, JR  1,497,853
SEWING MACHINE
Filed March 24, 1920   10 Sheets-Sheet 1

Inventor
R. R. Hughes

By Sturtevant & Mason
Attorneys

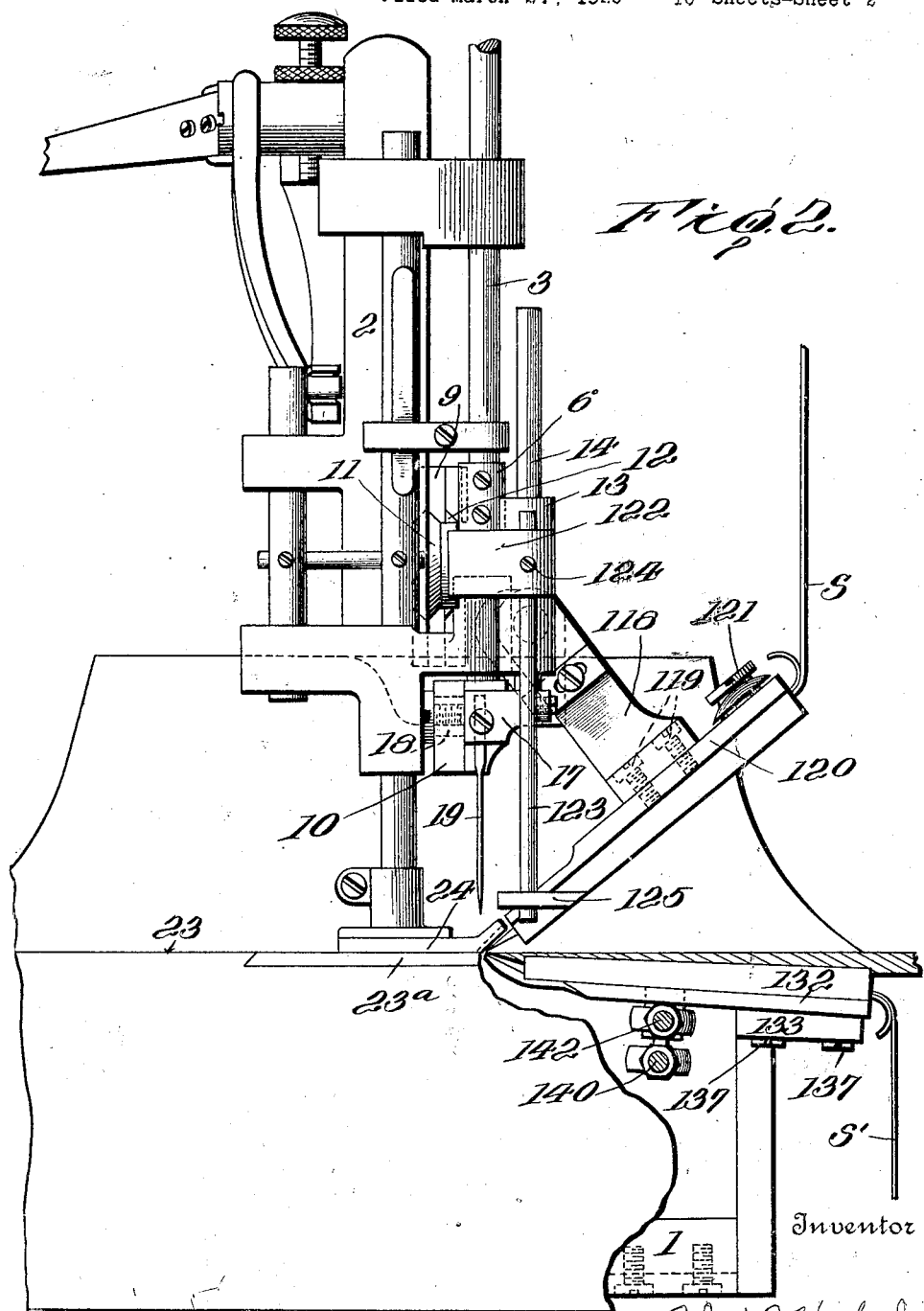

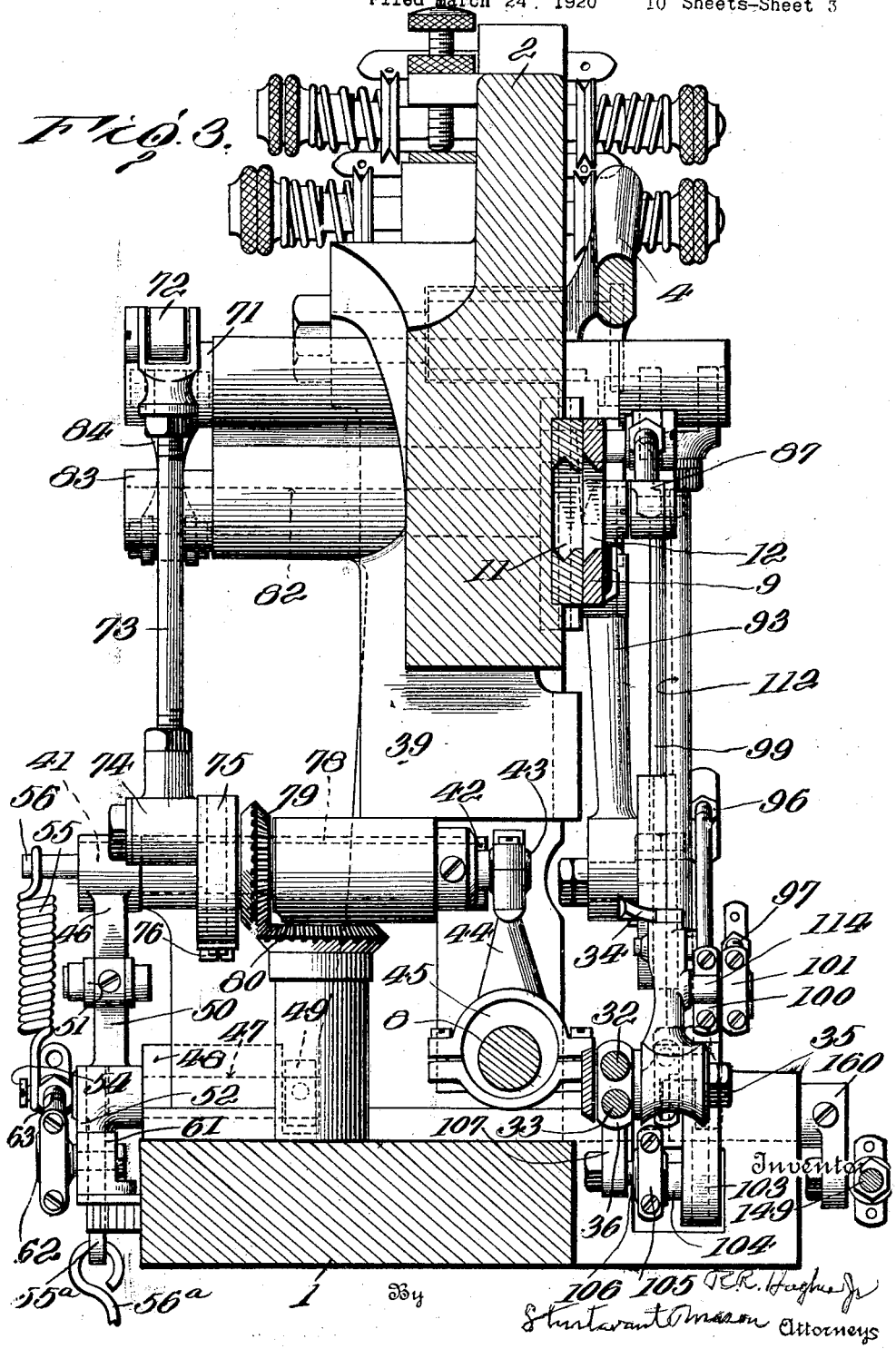

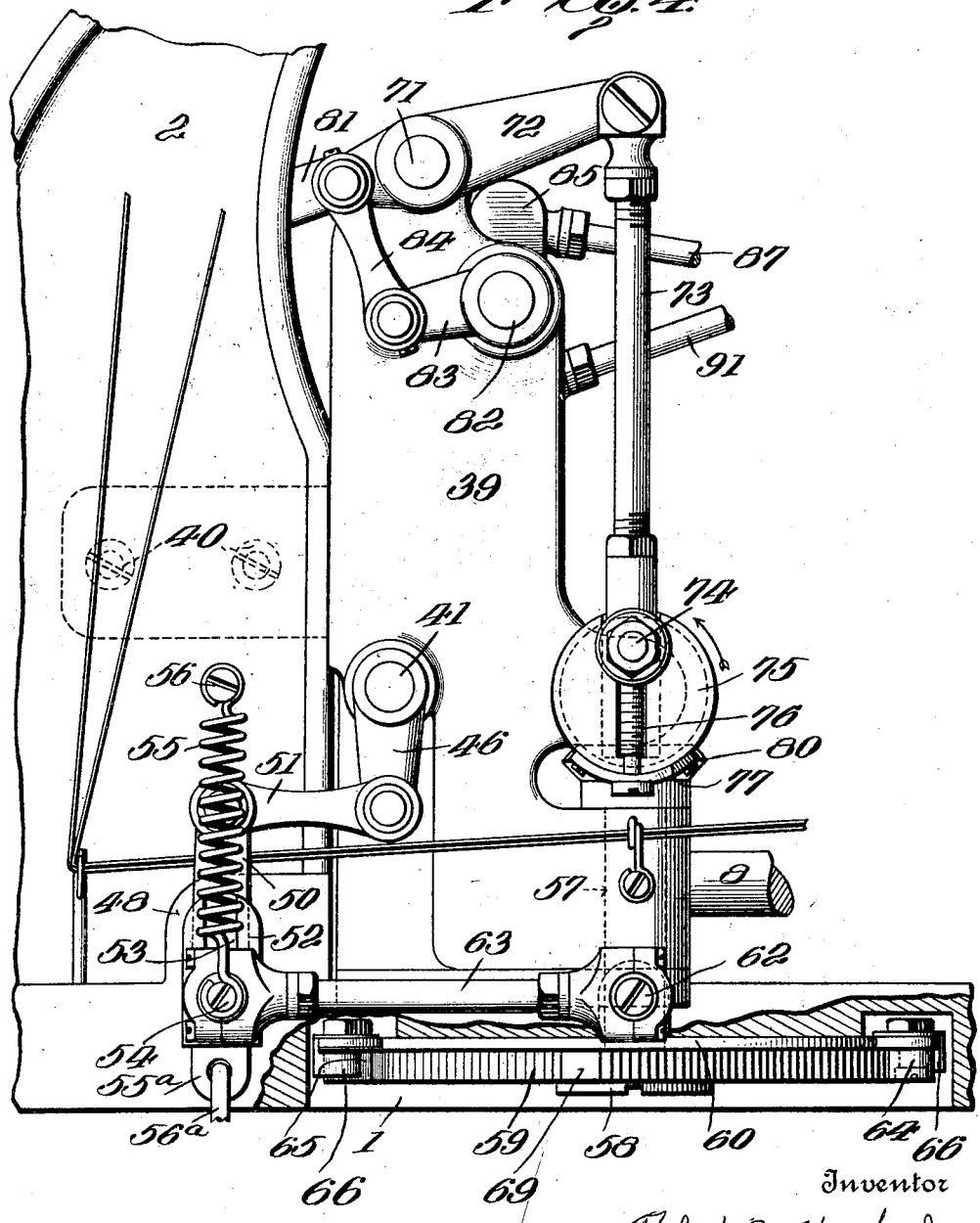

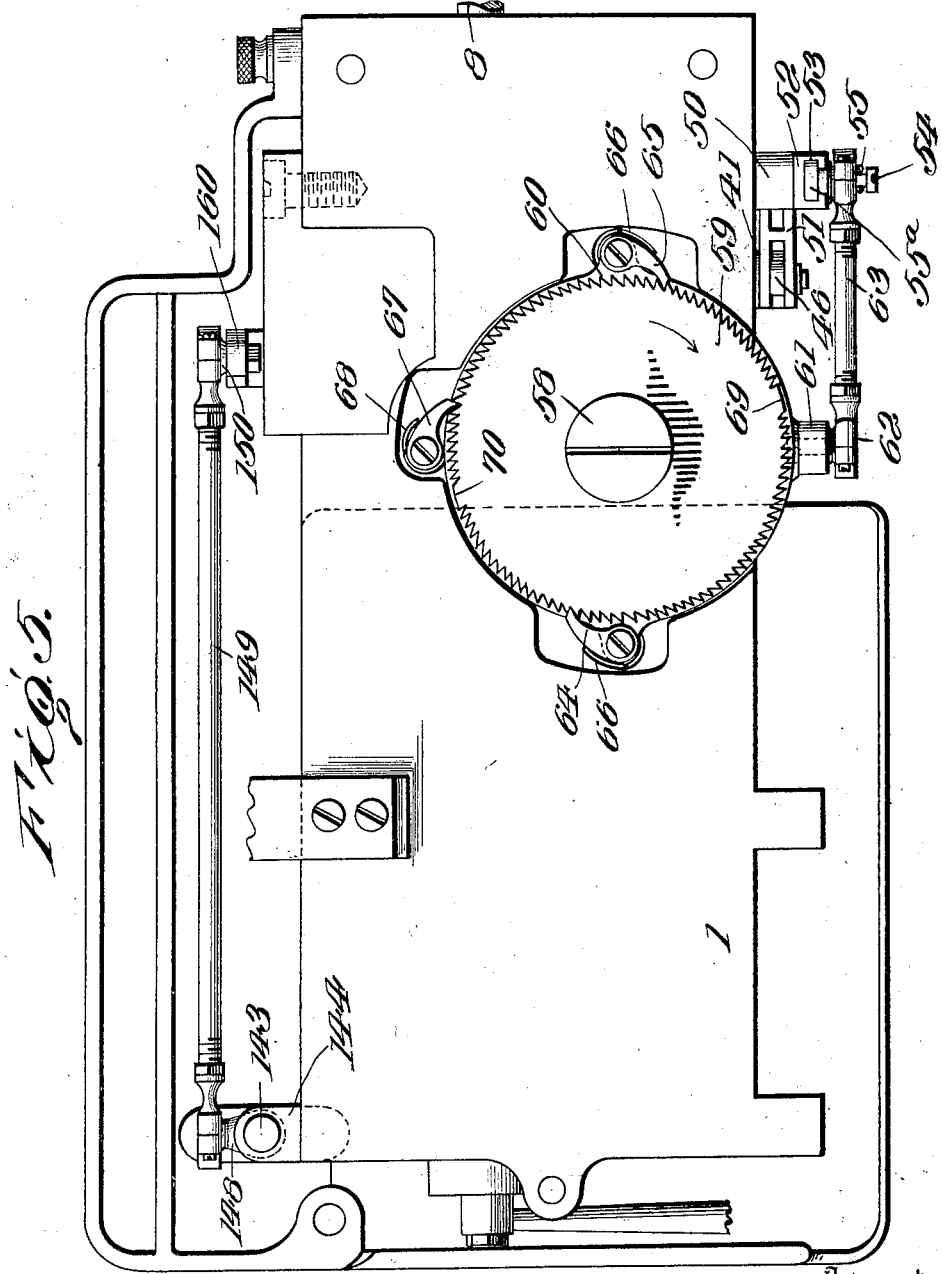

June 17, 1924. 1,497,853
R. R. HUGHES, JR
SEWING MACHINE
Filed March 24, 1920 10 Sheets-Sheet 6
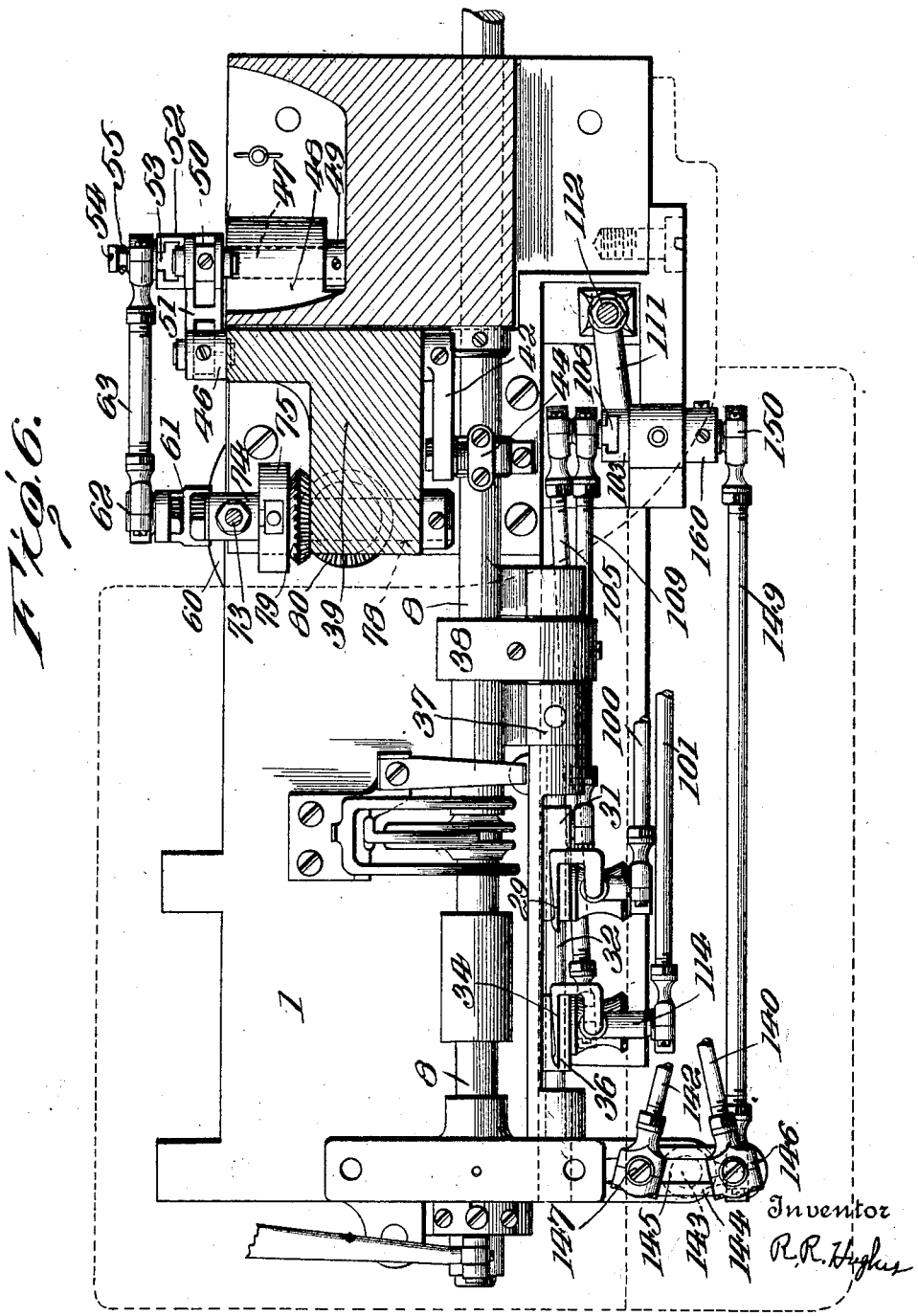

June 17, 1924.
R. R. HUGHES, JR
1,497,853
SEWING MACHINE
Filed March 24, 1920    10 Sheets-Sheet 7
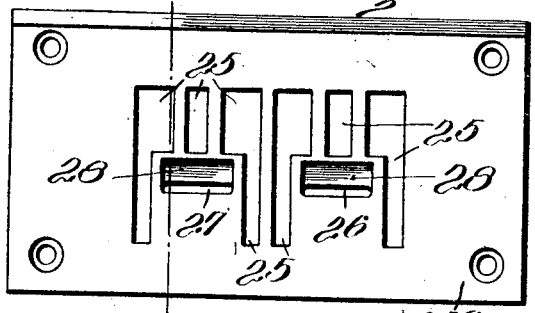
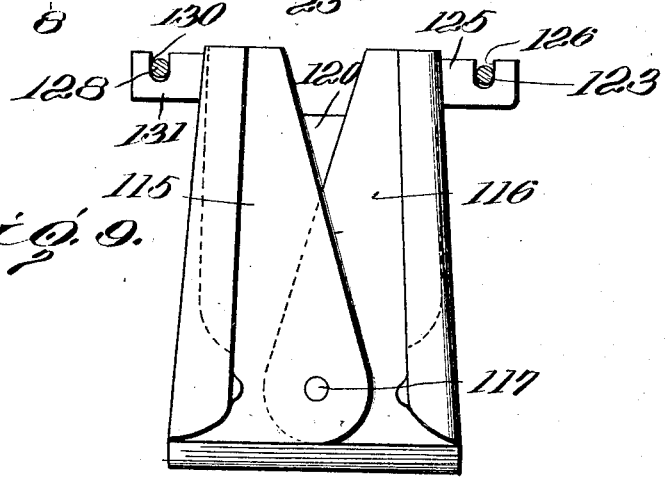
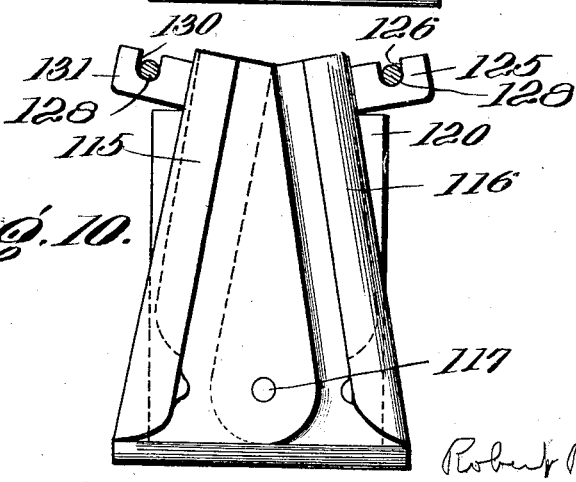

June 17, 1924.

R. R. HUGHES, JR 1,497,853

SEWING MACHINE

Filed March 24, 1920     10 Sheets-Sheet 8

Inventor
Robert R. Hughes Jr

By  Sturtevant Mason
Attorneys

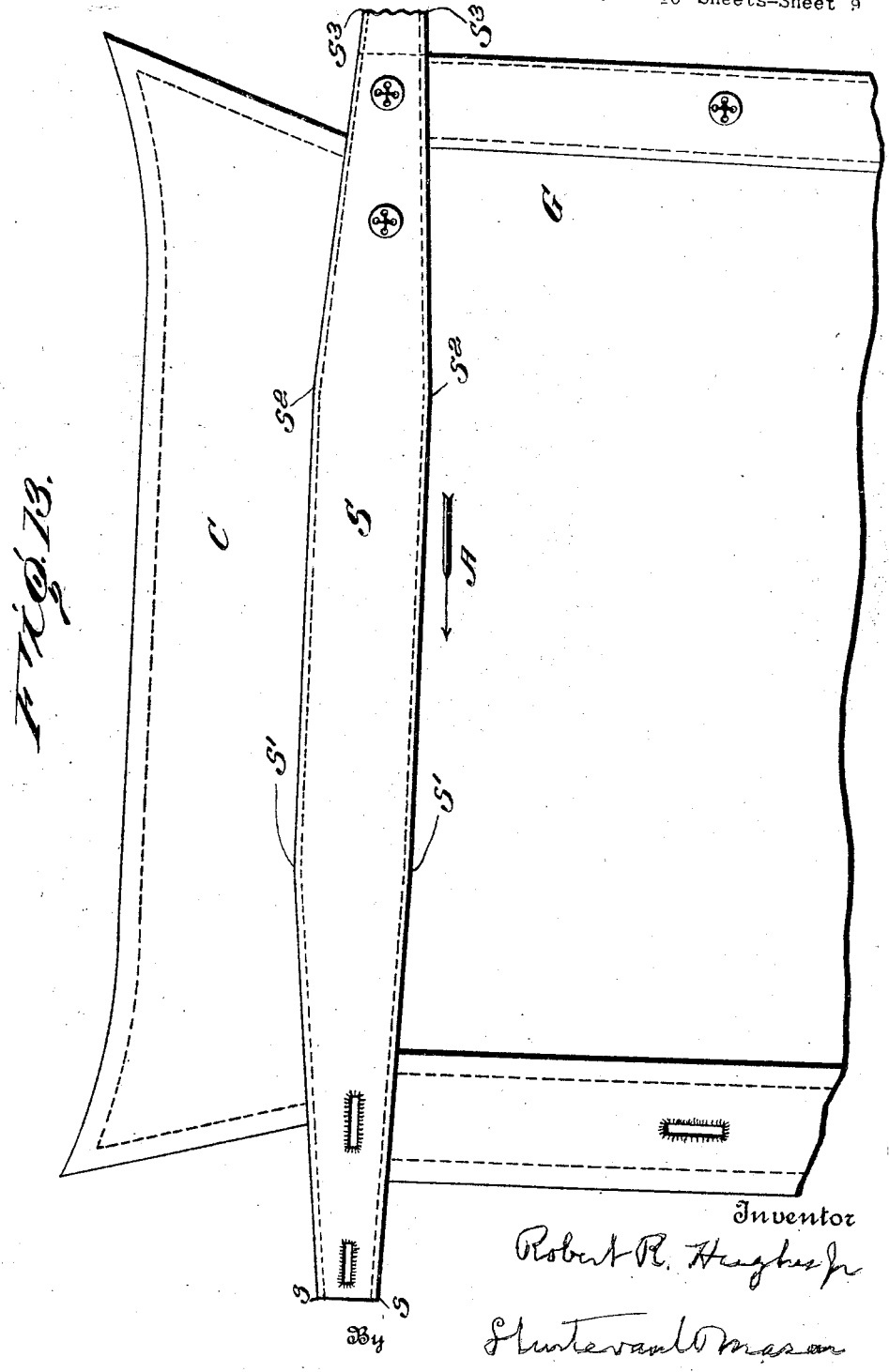

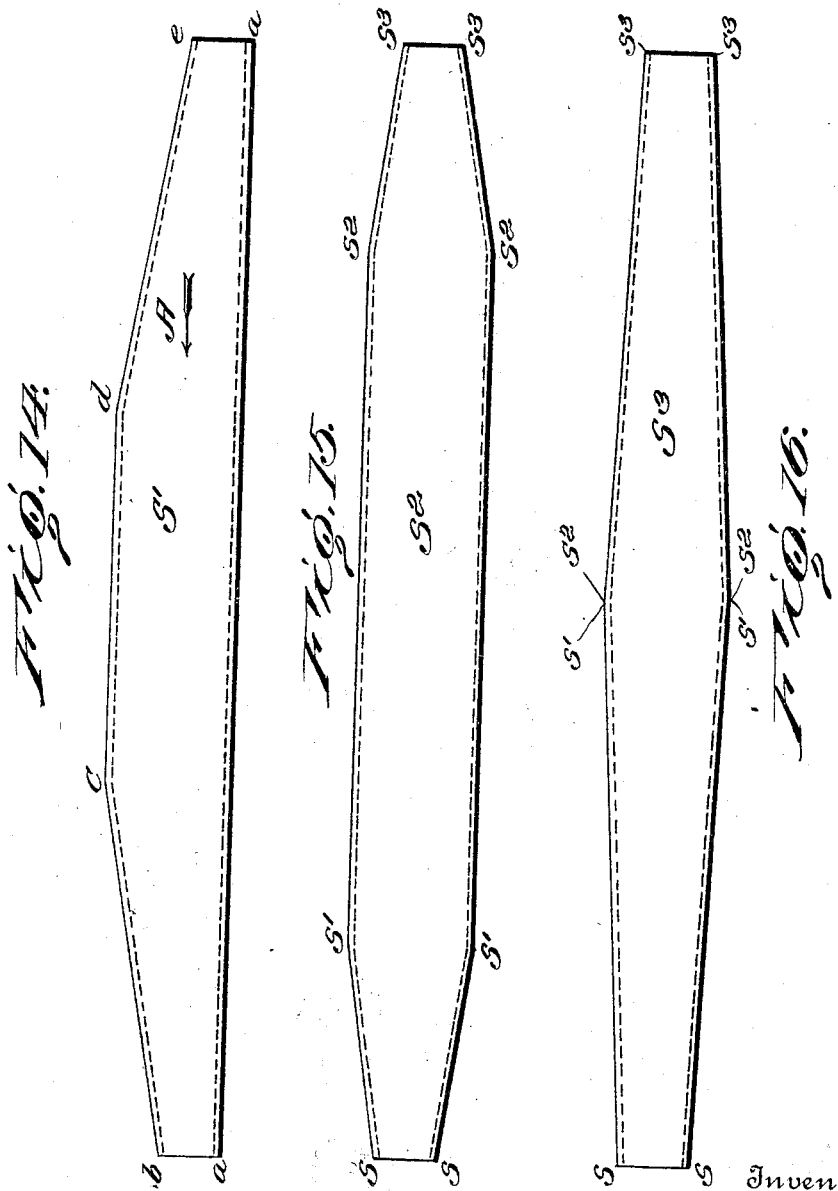

Patented June 17, 1924.

1,497,853

UNITED STATES PATENT OFFICE.

ROBERT R. HUGHES, JR., OF UTICA, NEW YORK, ASSIGNOR TO UNION SPECIAL MACHINE COMPANY, OF CHICAGO, ILLINOIS, A CORPORATION OF ILLINOIS.

SEWING MACHINE.

Application filed March 24, 1920. Serial No. 368,271.

*To all whom it may concern:*

Be it known that I, ROBERT R. HUGHES, Jr., a citizen of the United States, residing at Utica, in the county of Oneida, State of New York, have invented certain new and useful Improvements in Sewing Machines, of which the following is a description, reference being had to the accompanying drawing, and to the figures of reference marked thereon.

The invention relates to new and useful improvements in sewing machines, and more particularly to a sewing machine having two or more needles for forming independent rows of stitching.

An object of the invention is to provide a sewing machine of the above character with means whereby the working position of the needles may be changed automatically during the operation of the machine so as to form lines of stitching which either diverge or converge relative to each other.

A further object of the invention is to provide a machine of the above character wherein manually controlled means is provided for setting into operation, at will, the automatic means for shifting the working position of the needles.

A further object of the invention is to provide a machine of the above character wherein the loopers cooperating with the respective needles are likewise automatically shifted to correspond with the shifting of the needles with which they are associated.

A still further object of the invention is to provide a machine of the above character wherein the automatic means for shifting the needles and the loopers comes to rest after a predetermined movement has been given to the needles and wherein the automatic mechanism may be set, at will, into operation for again shifting the position of the needles, whereby a collar for a garment may be stitched, having lines of stitching which diverge from the ends of the collar toward the center thereof, and wherein the center section is stitched by parallel rows of stitching.

Still another object of the invention is to provide a machine of the above type with guiding devices for the fabric strips forming the collar of the garment, which guiding devices are so constructed that the capacity thereof may be changed automatically so as to maintain the folded edge of the collar a uniform distance from the line of stitching adjacent the edge throughout the entire stitching of the collar.

These and other objects will in part be obvious and will in part be hereinafter more fully disclosed.

In the drawings, which show by way of illustration one embodiment of the invention:—

Fig. 2 is a view partly in end elevation and partly in section showing the front end of a machine having my improvements embodied therein;

Fig. 3 is a sectional view on the line 3—3 of Fig. 1;

Fig. 4 is a side elevation of the parts of the machine adjacent the standard and viewed from the rear of the machine, with certain parts sectioned;

Fig. 5 is a view of the under side of the bed of the machine;

Fig. 6 is a view partly in section and partly in plan, the section being taken on the line 6—6 of Fig. 1, and the plan view showing the parts beneath the work support, the end of the needle lever extension being omitted;

Fig. 7 is a plan view of the throat plate;

Fig. 8 is a sectional view on the line 8—8 of Fig. 7;

Fig. 9 is a top plan view of the upper folder with the parts thereof in expanded position;

Fig. 10 is a similar view showing the folder as contracted to its inner limit;

Fig. 13 is a plan view showing the body of a garment with the collar stitched thereto by my improved machine;

Fig. 14 shows a modified form of collar strip stitched by my machine;

Fig. 15 is a similar view showing another modified form of collar strip, and

Fig. 16 is still another similar view showing a further modified form of collar strip.

Figure 1:
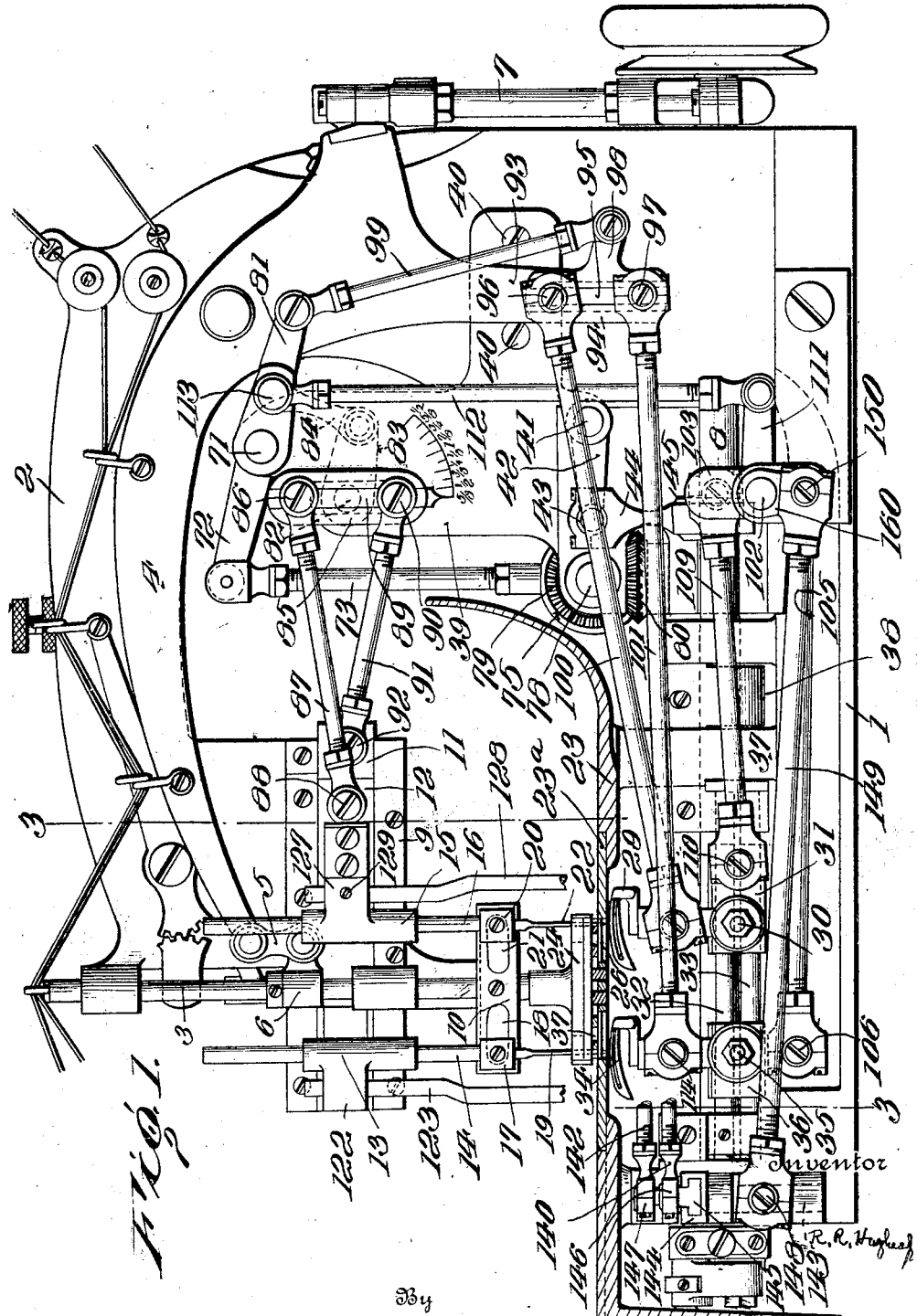
Figure 1 is a view partly in front elevation and partly in vertical section through a machine embodying my improvements.

The invention is directed particularly to a sewing machine having preferably two needles and associated with each needle is a looper so that two independent lines of stitching are formed. The needles are carried by auxiliary needle bars which are attached to the main needle bar in such a way that they may be shifted laterally relative to the main needle bar and preferably simultaneously in opposite directions toward and from said main needle bar. This shifting of the working positions of the needle bars is accomplished automatically and during the running of the machine, so that lines of stitching will be formed which either diverge relative to each other in the direction of feed, or converge relative to each other, depending upon the particular part of the automatic shifting mechanism which is in effective operation. Means is also provided for simultaneously shifting the working positions of the loopers so as to maintain each looper in proper operative position relative to its respective needle so as to avoid any possible chance of skipping of stitches. Means is further provided for guiding the upper and lower sections of a collar strip which are to be stitched together in the forming of a collar, and these guiding devices are formed so that they may be contracted or expanded and thus the strip being stitched folded just to the right extent so that the folded edges will be a uniform distance from the line of stitching adjacent the same, notwithstanding that the lines of stitching may converge or diverge relative to each other.

The automatic mechanism for controlling the position of the needles and the loopers, and the sections of the folders is so constructed, that the effective action thereof ceases at a predetermined time, and when the controlling mechanism comes to rest, it will remain at rest so that parallel lines of stitching may be produced until, at the will of the operator, said automatic mechanism may be again thrown into operation.

Referring more in detail to the drawings, my improved machine consists of a supporting bed 1 from which rises an overhanging arm 2. Mounted in the outer end of the overhanging arm 2 is a needle bar 3 which is reciprocated by a needle lever 4. The needle lever 4 is connected by a link 5 to a collar 6 fixed to the needle bar. The needle lever is oscillated by an eccentric strap 7 which cooperates with an eccentric on the main shaft 8. Mounted on the overhanging arm 2 is a supporting bracket 9. The needle bar 3 is provided with a cross head 10. The bracket 9 is formed with two dove-tailed guideways, in one of which is a sliding bar 11, and in the other of which is a sliding bar 12. Mounted on the sliding bar 11 is a sleeve 13. An auxiliary needle bar 14 reciprocates freely in this sleeve 13. Mounted on the sliding bar 12 is a sleeve 15. An auxiliary needle bar 16 freely reciprocates in this sleeve 15. The needle bar 14 is provided with a sliding block or head 17 which engages a horizontal guideway 18 in the cross head 10. This block or head carries a needle 19. The auxiliary needle bar 16 is provided with a block or head 20 which has a sliding engagement with a guideway 21 in the cross head 10, and this block or head 16 carries a needle 22.

From the above it will be apparent that as the needle bar 3 reciprocates, the cross head 10 will cause the auxiliary needle bars 14 and 16 to reciprocate in the sleeves 13 and 15. At the same time, the sliding bars 11 and 12 may be moved relative to each other and thus the sleeves 13 and 15 moved in and out toward the main needle bar 3, and as the sleeves are moved, the auxiliary needle bars 14 and 16 will have their working position, that is, the position in which they reciprocate, shifted toward and from the main needle bar 3. The sliding connection between the blocks or heads 17 and 20 and the cross head permit of this lateral movement of the auxiliary needle bars without disturbing their vertical reciprocations.

Carried by the bed plate 1 is a work support 23. The material is held on the work support by a presser foot 24 and is fed across the work support by the usual feeding mechanism which includes feed dogs working in feed slots 25 (see Fig. 7). The throat plate 23ª is provided with an elongated needle slot 26 for the needle 22 and an elongated needle slot 27 for the needle 19. This permits the needles to be shifted laterally of the line of feed. The slots through which the needles pass are relatively narrow in the direction of feed and the throat plate is provided with a recess 28 on its upper face in rear of each needle slot. An ordinary needle slot extends in rear of the path of the needle a stitch length or more, which permits the stitches to be freely drawn up and set. If the elongated needle slots of my machine were extended to the usual extent in rear of the needle, there would be such a large opening through the throat plate that the material might be carried down by the needle into the opening. I have, however, avoided this difficulty by making the slots relatively narrow and less than a stitch length in width and by forming a recess in the upper face of the throat plate directly in rear of the slots which relieves the concatenated threads from any clamping pressure of the presser foot, and therefore, the threads are free to be drawn up and set.

Cooperating with the needle 22 beneath the work support, is a looper 29. This looper is pivotally connected at 30 to a looper carrier 31. The looper carrier 31 is mounted so that it may slide freely on a looper support consisting of two parallel supporting rods 32 and 33. While this looper carrier may slide lengthwise of the rods, it is held from any turning movement about the center of the rods. Cooperating with the needle 19 is a looper 34. This looper is pivoted at 35 to a looper carrier 36 and the looper carrier 36 is mounted so as to slide freely endwise of the supporting rods 32 and 33. The rods 32 and 33 which make up the looper support are connected to a short shaft extending through a bearing support 37 and an arm 38 of the usual construction cooperates with an eccentric on the main shaft 8 for oscillating said looper support, and the oscillations of the looper support gives needle avoiding movements to the loopers. The loopers are of the usual threaded type for forming a double locked chain stitch.

Before describing the means for guiding and folding the fabric strips which form the sections of the collar of the garment, I will now describe the manually controlled automatic means for shifting the loopers, and needles laterally toward and from a vertical plane containing the axis of the main needle bar. Mounted underneath the overhanging arm and close to the standard of the machine is a supporting bracket 39 which is secured by suitable clamping screws 40—40 to the standard of the machine. Mounted in this bracket is a shaft 41. The shaft 41 at the front side of the machine carries an arm 42 having a ball stud 43 at its outer end. An eccentric strap 44 is connected to this ball stud and this eccentric strap cooperates with an eccentric 45 on the main shaft 8. At the rear face of the bracket 39 said shaft 41 carries an arm 46. A short stub shaft 47 is mounted in a lug 48 formed as a part of the standard of the machine (see Fig. 6). A collar 49 is secured to the inner end of this stub shaft and operates to hold the same in its bearings. On the outer end of the stub shaft there is an upwardly extending arm 50. A link 51 connects the depending arm 46 with the upwardly extending arm 50. When the shaft 41 is oscillated through the action of the eccentric 45 on the main shaft 8, it will cause the stub shaft 47 to oscillate. Also mounted on this stub shaft 47 is a depending arm 52 which is formed with a radially disposed undercut recess 53. A ball stud 54 is mounted on a block which is capable of sliding lengthwise of this radial recess 53. A spring 55 attached to the ball stud at its lower end and to a pin 56 at its upper end serves to normally raise the ball stud to a position directly over the axis of the stub shaft 47 so that the oscillations of the ball shaft 47 will impart no bodily movement to the ball stud 54. The block carrying the ball stud 54 has a depending ear 55ª to which a link or chain 56ª is attached and this link or chain is connected at its lower end to a foot treadle. When the operator depresses the foot treadle the ball stud 54 will be moved downwardly away from the center of the shaft 47 and thus lateral movements will be imparted thereto.

Journaled in the bracket 39 is a short vertical shaft 57. Secured to the lower end of this shaft 57, by means of a screw 58 is a toothed pattern wheel 59. This pattern wheel 59 is shown in side view in Fig. 4 and in under plan view in Fig. 5. The pattern wheel 59 is moved step by step in the direction of the arrow in Fig. 5 by means of a ring 60 which is mounted so as to turn freely about the axis of the shaft 57. This ring carries an outwardly extending arm 61 provided with a ball stud 62, and a link 63 connects this ball stud 62 with the ball stud 54. Mounted on the ring 60 are two diametrically opposed pawls 64 and 65. Said pawls are pivoted to the ring and a spring 66 associated with each pawl normally press the pawls into engagement with the teeth of the pattern wheel 59. Any retrograde movement of the pattern wheel 59 is avoided by the holding pawl 67 which is mounted on the bed 1 and is pressed into engagement with the teeth of the pattern wheel by means of a spring 68.

From the above it will be apparent that when the operator depresses the treadle, the ring carrying the pawls 64 and 65 will be oscillated through the train of mechanism connected with the eccentric 45 on the main shaft and this oscillation of the pawls will feed the pattern wheel step by step, one or more teeth at a time, depending upon the throw of the ring carrying the pawls and the throw of the ring carrying the pawls is determined by the extent to which the treadle is depressed. The pattern wheel 59 is formed with two extended blank sections 69 and 70. When the pattern wheel has been stepped around until the operating pawls come into engagement with these blank sections 69 and 70, respectively, then the throw of the pawls will not be sufficient to carry them off from the blank sections, and therefore the pattern wheel will come to rest.

The recess 53 in the arm 52 is formed eccentric to the center of the ball stud 62 when the pawls 64 and 65 are at the rear end of their strokes (see Fig. 4), and the eccentricity of the slot is so arranged that when the ball stud 54 is brought back to the center of the shaft 47, the link 63 will be moved endwise and shift the ring carrying said pawls so as to bring said operating pawls off from the blank sections 69 and 70. This positions the pawls so that on their next forward movement, they will operate the pattern wheel. This movement, however, of the ball stud 54 over the center of the shaft 47, will cause all endwise movement of the link 63, to cease until the treadle is again depressed. As a result, it will be obvious that when the treadle is first depressed, the pattern wheel will be set into action and be fed step by step until the blank section comes underneath the operating pawls, at which time, the pattern wheel comes to rest notwithstanding the fact that the treadle may be held depressed and the pawls continue to oscillate. The period at which the pattern wheel is at rest is therefore entirely under the control of the operator. When it is desired to start the pattern wheel again into action, the treadle is released, which moves the operating pawls back off from the blank sections in the pattern wheel and then again depressed, and this will start the pawls into action and the pattern wheel will be fed step by step in a forward direction.

Mounted in the upper end of the bracket 39 is a cross shaft 71. This cross shaft has a forwardly extending arm 72 at the outer end of which is pivoted a link 73. The link 73 is pivoted at its lower end to a crank pin 74. The crank pin 74 is carried by a block which may be adjusted radially of a disk 75 by means of an adjusting screw 76. The adjusting screw has a threaded connection with the block carrying the pin, and is held from endwise movement relative to the disk 75 by means of a plate 77. This disk 75 is mounted on the end of a short shaft 78. Said shaft 78 carries a bevel gear 79 which meshes with a bevel gear 80 mounted on the upper end of the shaft 57, and this shaft 57 is fixed to the pattern wheel. As the pattern wheel therefore is fed step by step, it will turn the shaft 57 and this will actuate the disk 75 which will cause the link 73 to move up and down and in turn impart movement to the shaft 71. The movement of the shaft 71 will be a step by step movement, first in one direction, and then the other, depending upon the movement of the crank pin 74 relative to the center of the disk 75. The extent of the step by step movement imparted to the shaft 71 will be determined by the position of the crank pin 74 on the disk 75, and this may be adjusted as above noted. It will further depend upon the extent of movement imparted to the pattern wheel, which is regulated by the extent to which the treadle is depressed.

Extending rearwardly from the shaft 71 is an arm 81. Mounted in the bracket 39 is another short shaft 82 (see Fig. 4). This shaft is provided with an arm 83 and the arm 83 is connected by a link 84 with the arm 81 on the shaft 71. The shaft 82 at the opposite end or front side of the machine carries a cross head 85. Mounted in this cross head is a sliding block carrying a pin 86. A link 87 is connected at one end to this pin 86 and at its other end to a pin 88 which is secured to the sliding bar 12 carrying the sleeve 15 in which the auxiliary needle bar 16 reciprocates. The cross head 85 is provided with a diametrically disposed guiding recess 89. The pin 86 is carried by the block which slides in this recess and which may be held in various adjusted positions in the recess. Also mounted on the cross head is a block, sliding in said recess and carrying a pin 90. A link 91 is connected to the pin 90 at its right hand end and at the left hand end thereof said link is connected to a pin 92 which is carried by the guide bar 11. This pin 90 is also adjustable in the recess. The pins 86 and 90 are on opposite sides of the center of the shaft 82 which is indicated in dotted lines in Fig. 1. As the shaft 71 moves step by step in one direction, it will impart a step by step movement to the shaft 82 in one direction, and this will cause the cross head 85 to move step by step from its vertical position as shown in Fig. 1. As this cross head moves either to the right or left, from its vertical position, it will, through the links 87 and 91, move the guide bars 11 and 12 and thus shift the working positions of the auxiliary needle bars. As the pin 90 moves to the right, the pin 86 moves to the left, and therefore, the two auxiliary needle bars 14 and 16 will be simultaneously shifted step by step, either toward or from the main needle bar 3, depending entirely upon the direction of rotation of the shaft 82 carrying the cross head 85.

The needle lever 4 is provided with a depending extension 93 and mounted at the lower end of this extension is a cross head 94. The cross head 94 is very much similar in construction to the cross head 85. It has a diametrically extending recess 95 in which are adjustably mounted pins 96 and 97. These pins may be shifted toward and from the center of the short shaft carrying the cross head 94. The cross head 94 has an outwardly extending arm 98. A link 99 connects this arm 98 with the arm 81 on the shaft 71. The looper 29 is oscillated by means of a link 100 which link is connected to the pin 96. The looper 34 is oscillated by means of a link 101 which is connected to the pin 97. The bodily movement of the lower end of the needle lever extension 93 moves both links bodily endwise and oscillates the loopers in the usual manner. When the shaft 71 is moved as above described the link 99 will be given a step by step endwise movement and this will shift the cross head 94 step by step from its vertical position, either to one side or the other, depending upon the direction of movement of the shaft 71. It will be understood that the crank pin 74 on the disk 75 always moves in the direction of the arrow in Fig. 4 and makes a complete rotation and this causes the shaft 71 to move step by step, first in one direction and then the other, as the rotating movements of the pin are converted into oscillating movements in the arm 72 connected with the shaft 71.

From the above it will be apparent that when the shaft 71 is moved step by step in one direction or the other and thus imparts the movement to the cross head 85, a similar movement will be imparted to the cross head 94 and as this cross head 94 moves on the needle lever extension, the pin 96 will be carried in one direction, while the pin 97 will be carried in the opposite direction relative to the axis about which the cross head 94 turns. The result is, that the oscillating links for the loopers will have their connection with the needle lever extension shifted to correspond to the bodily shifting of the loopers toward and from the vertical plane containing the main needle bar which will now be described.

Mounted on a short shaft 102, journaled in the base 1 of the machine, is a cross head 103 which is of the general type of the cross heads 85 and 94. This cross head carries an adjustable pin 104 to which a link 105 is connected, and this link at its other end is connected to a ball stud 106 carried by a depending arm 107 rigidly fixed to the looper carrier 36. Said cross head carries also a pin 108 (see Fig. 6) to which a link 109 is pivoted, and this link, at its forward end is connected with a ball stud 110 on the looper carrier 31. The cross head carries an arm 111 which extends rearwardly and a link 112 is pivoted thereto. The upper end of this link is pivoted at 113 to the arm 81. The operation of this cross head is thought to be obvious from the detail description, which has been given above in connection with the cross heads 85 and 94. The movement of the arm 81 will oscillate the cross head, and as it moves step by step away from the vertical, the link 109 will cause the looper carrier 31 to shift bodily on the looper support toward the central plane between the loopers and at the same time will move the link 105 in the opposite direction, and this will cause the looper carrier 36 to move bodily on the looper support to the right and toward the central plane. The link 101 is pivotally connected to a stud 114 carried by the looper, and this stud extends outwardly a sufficient distance so that the link 101 is free to work in front of the link 100.

From the above it is thought that the operation of the automatic means for shifting the needles and the associated loopers will be apparent. When the pattern wheel is set into operation by releasing the treadle, and then depressing the same, the shaft 71 will be moved step by step in one direction or the other as above described. In Fig. 1 of the drawings, the needles are shown as in their extreme outer positions, having been separated from each other as far as the mechanism of the machine will permit. Attention is called to the fact however, that the pattern wheel 59 in Fig. 5 is not set to correspond to this extreme position of the needles for the reason that the pattern wheel is shown as having been stepped around through a series of operations of the feed pawls thereon. When the shaft 71 is moved, the three cross heads 85, 94 and 103 will all be turned simultaneously, step by step, away from their vertical position, and as these cross heads are shifted, the auxiliary needle bars will be caused to shift step by step toward each other, the loopers will also be bodily shifted step by step toward each other, and the connection between the links which operate the respective loopers and the needle lever extension, will be shifted step by step to accommodate this new positioning of the loopers and thus preserve the proper timing between the loopers and the needles. As this pattern wheel is stepped around through an angle of 180°, the needles will be shifted to their extreme inner positions. During this movement of the pattern wheel, the crank pin 74 will have moved through an angle of 180° which gives the maximum throw to the crank pin. At this time, the operating pawls for the pattern wheel are brought onto the blank sections, and pattern wheel stops. The needles have been caused to approach each other to the extreme limit and will remain set in this position until the operator again releases the treadle and depresses the same which sets the pattern wheel into operation for a second cycle of movement and this causes the needle bars to again shift and move step by step to their extreme outer positions, that is, as positioned in Fig. 1.

My improved machine is especially adapted for stitching collars to the body of a shirt. In Fig. 13 I have shown more or less diagrammatically, the body of a shirt which is indicated at G to which a collar C is stitched. The machine is particularly adapted for stitching the collar strip section indicated at S. This section of the collar is double, that is, it has a front and rear section which are alike in shape. It will be noted that these collar strip sections S are tapered from the point $s-s$ at the left to the point $s'-s'$ and from $s'-s'$ to $s^2-s^2$, the edges are parallel, and from $s^2-s^2$ to $s^3-s^3$ the edges again are tapered. The strip is fed through the machine in the direction of the arrow A, and following the direction of movement, it will be noted that the lines of stitching which are indicated by the broken lines, diverge from the points $s-s$ to the points $s'-s'$, and the lines of stitching are parallel between the points $s'-s'$ and $s^2-s^2$ and the lines of stitching converge from $s^2-s^2$ to $s^3-s^3$.

Figure 11:
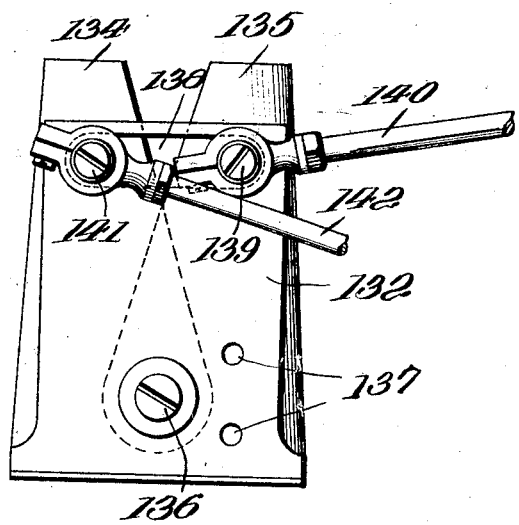
Fig. 11 is a bottom plan view of the lower folder with the parts thereof in expanded position.
Figure 12:
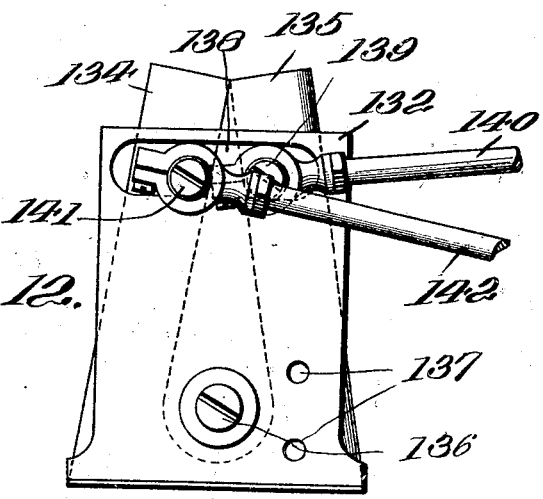
Fig. 12 is a similar view but showing the parts of the folder contracted to their extreme inner limit.

There is an upper folder for directing the upper collar strip S and an under folder for directing the under collar strip S. These folders and the means for controlling the same will now be described. The upper folder is shown in detail in Figs. 9 and 10 and is formed of two sections indicated at 115 and 116. These two sections 115 and 116 are pivoted together at 117 so that the delivery end of the folder may be adjusted for expanding or contracting the folder for turning in the edges of the collar strip a varying extent, thus producing a taper in the collar strip. This upper folder is shown in Fig. 2 as carried by a bracket arm 118 which is in turn secured to the head of the machine. Screws 119, 119 pass through the bracket into the supporting base 120 of the folder and the two sections of the folder are not only pivoted together as at 117 but are pivoted to this supporting base. The pivot screw is indicated at 121 in Fig. 2 of the drawings. The collar strip S is led from a suitable source of supply through this upper folder, and the edges of the collar strip will be inturned. The sleeve 13 is formed integral with the arm 122 and this arm is secured to the sliding bar 11. The arm is formed with a vertical opening in which is placed a rod 123 held in the arm by a set screw 124. The section 116 of the folder is provided with a projecting lug 125 having a recess 126 into which the depending rod 123 extends. The sleeve 15 is likewise carried by an arm 127, and a rod 128 secured to this arm by a set screw 129 extends downwardly and into a recess 130 in a lug 131 carried by the section 115 of the folder. It will readily be seen that as the needle bars 14 and 16 are shifted toward each other, the rods 123 and 128 will be likewise moved toward each other, and this will move the inner end of the folder so as to contract the delivery end thereof and in turn the edges of the strip S to a greater extent. Thus it is that the strip S is given a taper which corresponds to the shifting of the working position of the needles and the lines of stitching will be a uniform distance from the folded edges of the strip, that is, parallel therewith notwithstanding the tapering of the strip. The folder for the under strip is shown in detail in Figs. 11 and 12 of the drawings. This folder consists of a supporting base plate 132. As clearly shown in Fig. 2 of the drawings, the base plate is secured to a bracket arm 133 and this bracket arm is attached to the work support of the machine. Mounted on the base plate 132 are two folder sections 134 and 135. These sections are pivoted together and to each other by a pivot screw 136 which extends through the base plate 133. The base plate 133 is secured by screws 137 to the bracket arm 133. The base plate is formed with a slot 138. The section 135 carries a pin 139 to which a link 140 is pivotally connected. The section 134 carries a pin 141 to which a link 142 is connected.

Referring to Fig. 6 of the drawings, it will be noted that at the extreme left hand of the machine there is a short vertical shaft 143 which carries a cross head 144. This cross head has a recess 145 extending diametrically of the shaft 143. Adjustably mounted in the recess 145 is a ball stud 146 with which the link 140 connects. Also adjustably mounted in the recess 145 is a ball stud 147 with which the link 142 is connected. There is an arm 148 extending from the shaft 143 and carrying a ball stud at its outer end. A link 149 is connected to this ball stud and the other end of this link is connected to a ball stud 150 carried by the arm 160 mounted on the shaft 102. This shaft 102 carries a cross head for moving the looper carrier bodily and as the cross head is shifted to bring about this bodily shifting of the looper carriers, the link 149 will be moved endwise and impart a similar step by step movement to the cross head 144. When this cross head moves from the position shown in Fig. 6 it will move the link 140 in one direction and the link 142 in the other direction, and this will either contract or expand the lower folder, depending upon the direction of movement of this cross head 144.

From the above it will be apparent that the upper and lower folders will both be so connected with the pattern wheel that simultaneously with the shifting of the working positions of the needles and loopers, the folders will be expanded or contracted, and as the needles and loopers are moved toward each other, the folders will be contracted, and the strip being folded will be, step by step, tapered or the edges brought toward each other and thus the lines of stitching will be kept parallel with the folded edges of the strips going through the folders and this results in a tapered stitched collar strip S S. On the other hand, when the needles and loopers move away from each other, the folders will be expanded step by step and again the strip tapered. In the stitching of the collar as shown in Fig. 13 where the arrow indicates the direction of feed, when the needles are at the points s—s, the folders are collapsed, the needles and loopers are at their extreme inner positions and the pattern wheel is idle because of the fact that the feed pawls are working on the blank sections thereof or because the treadle has been released and the feed pawls are not in operation. As soon as the proper point is reached for stitching the collar strip, the treadle is depressed, and this sets the feed pawls into operation for feeding the pattern wheel step by step, and as the pattern wheel is fed around step by step, the working positions for the needles and loopers will be caused to shift away from the center plane step by step, and at the same time, the folders will be expanded step by step and the result is that the collar strip S will be gradually tapered outwardly and the lines of stitching will diverge and be placed parallel with the folded edges of the strip. When the points $s'$—$s'$ are reached, the pattern wheel is turned through an arc of 180° and the feeding pawls engage the blanks on the pattern wheel and it automatically comes to rest. As soon as the pattern wheel comes to rest, then the needles will continue to reciprocate in fixed positions and parallel lines of stitching will be produced. The machine will continue to stitch parallel lines of stitching until the operator has released and again depressed the treadle. When the points $s^2$—$s^2$ are reached, the operator by depressing the treadle after having released the same, sets into action the pattern wheel and again the needles and loopers will be shifted step by step toward the center plane and the folders step by step contracted until the points $s^3$—$s^3$ are reached, when the pattern wheel again automatically stops and the collar is finished. It will be seen therefore that in my machine, I have automatic means for shifting the working positions of the needles and the loopers and also changing the capacity of the folders, which automatic means stops at a predetermined point and is under the control of the operator so that it may be set manually into operation whenever desired.

In Fig. 14 of the drawings I have shown a collar strip indicated at S' which is slightly different in shape from that shown in Fig. 13. In this form of collar strip the left hand needle forming the line of stitching $a$—$a$ is in fixed position so that the line of stitching is straight. The left hand section of both the upper and lower folders are fixed and have no shifting movement. The right hand needle and the right hand section of the folder are shifted so as to form a diverging line of stitching from the point $b$ to the point $c$, and from $c$ to $d$, the working position of the right hand needle is held fixed so that this line of stitching is parallel with the line of stitching $a$—$a$. From $d$ to $e$ the working position of the right hand needle is again caused to shift so as to produce a converging line of stitching. The direction of feed is indicated by the arrow A in this figure. In Fig. 15 I have shown a further slightly modified shaping of the collar strip which is indicated at $S^2$. In this figure, the distance between the points $s$—$s$ and $s'$—$s'$ is much shorter than that shown in Fig. 13. Likewise the distance between $s^2$—$s^2$ and $s^3$—$s^3$ is very much shorter and this is brought about by one of the several adjustments. If the length of feed strokes of the pawls for operating the pattern wheel be increased then the pattern wheel will be turned through the 180° arc much quicker relative to the length of feed of the material by the feed pawl of the machine, and the resulting taper will be as indicated in Fig. 15. On the other hand, the feed strokes of the feeding pawls may be the same as above, and the feed of the machine be changed so as to shorten the stitch, and then the section or collar strip fed through the machine, while the pattern wheel is turning through an arc of 180° will be much less and the taper will be as indicated in this Figure 15. It will be obvious that the amount of lateral movement given to the needles and loopers and the folders may also be varied, and this may be accomplished in several ways. If the crank pin 74 be adjusted radially of the disk 75 by means of the screw 76, the throw of the arm 72 will be varied, and this in turn will vary the throw of the cross heads controlled thereby, and thus the amount of lateral movement varied. On the other hand, the amount of lateral movement imparted to the needles or to the loopers or to the folders may be varied by shifting the connection of the links with the respective cross heads.

In Fig. 16 of the drawings, I have shown another slightly modified form of collar strip indicated at $S^3$. In this form, the distance between the lines $s$—$s$ and $s'$—$s'$ is greatly increased and $s'$—$s'$ and $s^2$—$s^2$ are caused to co-incide; and likewise the distance between $s^2$—$s^2$ and $s^3$—$s^3$ is increased. This is accomplished by varying the extent of taper in either of the manners above described, and by the operator at once releasing and depressing the treadle, when the point $s'$—$s'$ is reached, so that the pattern wheel when it stops is immediately again set into action.

It will be obvious from the above that various other modifications in the shifting of the parts relative to each other, and also various modifications in the details described and in the arrangement of parts may be made without departing from the spirit of the invention as set forth in the appended claims.

Having thus described the invention, what I claim as new and desire to secure by Letters Patent, is:—

1. A sewing machine including in combination a plurality of needles, means for automatically and positively shifting, step by step, the working positions of said needles relative to each other, and manually controlled means for setting said automatic means into operation.

2. A sewing machine including in combination a plurality of needles, a looper cooperating with each needle, means for automatically and positively shifting, step by step, the working positions of said needles and their respective associated loopers relative to each other, and manual means for setting said automatic means in operation.

3. The combination of a plurality of needles, a folder adapted to be contracted or expanded, means for automatically and simultaneously shifting, step by step, the working positions of said needles relative to each other, and means for expanding or contracting said folder as the working positions of the needles are shifted relative to each other whereby the edge of the strip passing through the folder when being stitched may be kept a uniform distance from the lines of stitching formed by the needles.

4. The combination of a plurality of needles, a folder adapted to be contracted or expanded, means for automatically and simultaneously shifting, step by step, the working positions of said needles relative to each other, means for expanding or contracting said folder as the working positions of the needles are shifted relative to each other whereby the edge of the strip passing through the folder when being stitched may be kept a uniform distance from the lines of stitching formed by the needles, and manually controlled means for setting said automatic means into operation.

5. The combination of a plurality of needles, a folder adapted to be contracted or expanded, means for automatically and simultaneously shifting, step by step, the working positions of said needles relative to each other, means for expanding or contracting said folder as the working positions of the needles are shifted relative to each other whereby the edge of the strip passing through the folder when being stitched may be kept a uniform distance from the lines of stitching formed by the needles, automatic means including devices for stopping the automatic means at a predetermined time, and manually controlled means for setting the automatic means into operation.

6. A sewing machine including in combination two needles, means for automatically and positively shifting, step by step, the working positions of said needles relative to each other, said automatic means including devices for stopping the automatic means at a predetermined time, and means for manually setting said automatic means in operation.

7. A sewing machine including in combination two needles, means for automatically shifting, step by step, the working positions of said needles relative to each other, said automatic means including devices for stopping the automatic means when said needles are shifted to their extreme position away from each other and to their extreme position near each other.

8. A sewing machine including in combination two needles, means for automatically shifting, step by step, the working positions of said needles relative to each other, said automatic means including devices for stopping the automatic means when said needles are shifted to their extreme position away from each other and to their extreme position near each other, and manually controlled means for setting said automatic means into operation.

9. A sewing machine including in combination a needle, a looper carrier, a looper pivotally mounted on said carrier and cooperating with said needle, means for oscillating the carrier for giving to the looper a needle avoiding movement, means for swinging the looper on said carrier into and out of the needle loop, and automatic means for bodily shifting the working position of the needle and the looper carrier.

10. A sewing machine including in combination a needle, a looper carrier, a looper pivotally mounted on said carrier and cooperating with said needle, means for oscillating the carrier for giving to the looper a needle avoiding movement, means for swinging the looper on said carrier into and out of the needle loop, and automatic means for bodily shifting the working position of the needle and the looper carrier, said automatic means including devices for stopping the automatic means when the looper and needle reach predetermined positions in their lateral movement, and manually controlled means for setting said automatic means in operation.

11. A sewing machine including in combination a needle, a looper carrier, a looper pivotally mounted on said carrier and cooperating with said needle, means for oscillating the carrier for giving to the looper a needle avoiding movement, means for swinging the looper on said carrier into and out of the needle loop, and automatic means for bodily shifting the working position of the needle and the looper carrier, said automatic means including devices for shifting the movement of the means for swinging the looper to the actuating member therefor to compensate for the shifting of the carrier on which the looper is mounted and for maintaining the timing between the looper and the needle.

12. A sewing machine including in combination two needles, a thread carrying looper associated with each needle, a separate carrier for each looper, a looper support on which said carriers are mounted whereby said carrier may be shifted bodily in a direction parallel with the line connecting the needles, means for oscillating the support for the looper carriers for giving a needle avoiding movement to the loopers, means for swinging the loopers on their carriers, and automatic means for shifting the working positions of the needles relative to each other and for shifting the carriers for the loopers on the support therefor to correspond to the shifting of the needles.

13. A sewing machine including in combination two needles, a thread carrying looper associated with each needle, a separate carrier for each looper, a looper support on which said carriers are mounted whereby said carrier may be shifted bodily in a direction parallel with the line connecting the needles, means for oscillating the support for the loopers, means for swinging the loopers on their carriers, and automatic means for shifting the working positions of the needles relative to each other and for shifting the carriers for the loopers on the support therefor to correspond to the shifting of the needles, said automatic means also including devices for varying the connection of the swinging means for the loopers as the looper carriers are shifted bodily so as to maintain the timing of the loopers relative to the needles.

14. A sewing machine including in combination a pair of needles, a thread carrying looper associated with each needle, a carrier on which each looper is mounted, a support for the looper carriers on which said looper carriers are bodily shiftable in a direction parallel with the line passing through the needles, a needle lever for vibrating said needles, said needle lever having an extension, independent links connecting said extension with the loopers for swinging the loopers on their carriers, and automatic means for shifting the working positions of the needles and for bodily shifting the loopers to correspond to the shifting of the needles and for shifting the connection of the links with the extension on the needle lever so as to maintain the timing of the loopers with the needles in all positions thereto.

15. A sewing machine including in combination a pair of needles, means for supporting the needles whereby they may be shifted laterally, step by step, relative to each other, a needle lever connected to the needles for reciprocating the same, a threaded looper cooperating with each needle, a carrier for each threaded looper, a support for the carrier on which the carriers may be moved bodily toward and from each other to correspond to the shifting movement of the needles, means for swinging said loopers on their carriers including an oscillating arm, a cross head carried thereby, and links having independent connections with the cross head and with the carriers, and automatic means for shifting the working positions of the needles and for bodily shifting said looper carriers and for adjusting said cross head whereby the needles and their cooperating loopers may be moved toward and from each other and the timing of the loopers and needles relative to each other maintained.

16. A sewing machine including in combination a work support, an overhanging arm, a needle bar, means for reciprocating the needle bar, sliding bars carried by the overhanging arm for horizontal movement, a sleeve mounted on each bar, an auxiliary needle bar mounted to reciprocate in each sleeve and having a connection with the main needle bar whereby the auxiliary needle bars may be moved, step by step, toward and from each other during the operation of the machine, a needle carried by each auxiliary needle bar, a pattern wheel, means for turning said pattern wheel, step by step, a cross head, means for shifting the cross head, first in one direction and then the other by said pattern wheel, independent links connected to the cross head and to said sliding bars, said links being connected at opposite sides of the center of the cross head whereby the swinging of the cross head will move the auxiliary needle bars toward and from each other.

17. A sewing machine including in combination a work support, an overhanging arm, a needle bar, means for reciprocating the needle bar, sliding bars carried by the overhanging arm for horizontal movement, a sleeve mounted on each bar, an auxiliary needle bar mounted to reciprocate in each sleeve and having a connection with the main needle bar whereby the auxiliary needle bars may be moved, step by step, toward and from each other during the operation of the machine, a needle carried by each auxiliary needle bar, a pattern wheel, means for turning said pattern wheel, step by step, a cross head, means for shifting the cross head, first in one direction and then the other by said pattern wheel, independent links connected to the cross head and to said sliding bars, said links being connected at opposite sides of the center of the cross head whereby the swinging of the cross head will move the auxiliary needle bars toward and from each other, said pattern wheel having devices whereby the same is stopped when the cross head has been moved a predetermined distance.

18. A sewing machine including in combination a work support, an overhanging arm, a needle bar, means for reciprocating the needle bar, sliding bars carried by the overhanging arm for horizontal movement, a sleeve mounted on each bar, an auxiliary needle bar mounted to reciprocate in each sleeve and having a connection with the main needle bar whereby the auxiliary needle bars may be moved, step by step, toward and from each other during the operation of the machine, a needle carried by each auxiliary needle bar, a pattern wheel, means for turning said pattern wheel, step by step, a cross head, means for shifting the cross head first in one direction and then the other by said pattern wheel, independent links connected to the cross head and to said sliding bars, said links being connected at opposite sides of the center of the cross head whereby the swinging of the cross head will move the auxiliary needle bars toward and from each other, said pattern wheel having devices whereby the same is stopped when the cross head has been moved a predetermined distance, and manually controlled means for setting said pattern wheel again into operation.

19. A sewing machine including in combination a work support, an overhanging arm, a needle bar, means for reciprocating the needle bar, sliding bars carried by the overhanging arm for horizontal movement, a sleeve mounted on each bar, an auxiliary needle bar mounted to reciprocate in each sleeve and having a connection with the main needle bar whereby the auxiliary needle bars may be moved, step by step, toward and from each other during the operation of the machine, a needle carried by each auxiliary needle bar, a pattern wheel, means for turning said pattern wheel, step by step, a cross head, means for shifting the cross head, first in one direction and then the other by said pattern wheel, independent links connected to the cross head and to said sliding bars, said links being connected at opposite sides of the center of the cross head whereby the swinging of the cross head will move the auxiliary needle bars toward and from each other, a looper cooperating with each needle, a looper carrier for each looper, and a looper support on which the carriers are mounted so that they may be moved bodily toward and from each other, a swinging cross head operated from the pattern wheel, and links connected at opposite sides of the cross head and to the carriers for shifting said carriers toward and from each other to correspond with the shifting of the needles.

20. A sewing machine including in combination a work support, an overhanging arm, a needle bar, means for reciprocating the needle bar, sliding bars carried by the overhanging arm for horizontal movement, a sleeve mounted on each bar, an auxiliary needle bar mounted to reciprocate in each sleeve and having a connection with the main needle bar whereby the auxiliary needle bars may be moved, step by step, toward and from each other during the operation of the machine, a needle carried by each auxiliary needle bar, a pattern wheel, means for turning said pattern wheel, step by step, a cross head, means for shifting the cross head, first in one direction and then the other by said pattern wheel, independent links connected to the cross head and to said sliding bars, said links being connected at opposite sides of the center of the cross head whereby the swinging of the cross head will move the auxiliary needle bars toward and from each other, a looper cooperating with each needle, a looper carrier for each looper, and a looper support on which the carriers are mounted so that they may be moved bodily toward and from each other, a swinging cross head operated from the pattern wheel, and links connected at opposite sides of the cross head and to the carriers for shifting said carriers toward and from each other to correspond with the shifting of the needles, a third cross head, links connected to said third cross head and to the loopers for swinging the same, means for bodily swinging the third cross head for moving the loopers, and means actuated by the pattern wheel for shifting said third cross head on its operating means for compensating for the bodily shifting of the looper carriers and the needles.

21. A sewing machine including in combination a pair of needles, a threaded looper cooperating with each needle, means for shifting the working positions of the needles relative to each other and for simultaneously shifting the working positions of the loopers relative to each other to correspond with the shifting of the needles, said means including a toothed pattern wheel, a vibrating pawl engaging said toothed pattern wheel for moving the same, step by step, said pattern wheel having a blank space formed therein whereby said pattern wheel automatically stops at a predetermined point with the pawl oscillating back and forth on said blank, and manual means for causing the pawl to shift the pattern wheel to bring the same into operation.

22. A sewing machine including in combination a pair of needles, a threaded looper cooperating with each needle, means for shifting the working positions of the needles relative to each other and for simultaneously shifting the working positions of the loopers relative to each other to correspond with the shifting of the needles, said means including a toothed pattern wheel, a vibrating pawl engaging said toothed pattern wheel for moving the same, step by step, said pattern wheel having a blank space formed therein whereby said pattern wheel automatically stops at a predetermined point with the pawl oscillating back and forth on said blank, an oscillating shaft, an arm having a radially disposed recess formed therein carried by the shaft, a link for actuating said pawl connected to a block sliding in said recess, a spring for shifting the block to position the connection with the link over the axis of the shaft, and manual means for shifting the block away from the axis of the shaft for causing the pawl to be vibrated.

23. A sewing machine including in combination a pair of needles, complemental stitch forming mechanism cooperating with the needles, means for shifting the needles and the complemental stitch forming mechanism associated therewith relative to each other, step by step, for forming diverging or converging lines of stitching, a folder having movable sections for guiding and folding the strip and varying the width of the folded strips step by step as it is presented to the needles, and means operating in timing with the shifting of the needles for expanding or contracting the folder whereby the tapered strip may be stitched and the lines of stitching placed parallel with the folded edges of the strip.

24. A sewing machine including in combination a pair of needles, complemental stitch forming mechanism cooperating with the needles, means for shifting the needles and the complemental stitch forming mechanism associated therewith relative to each other, step by step, for forming diverging or converging lines of stitching, an upper and a lower folder, each including movable sections which may be shifted, step by step for guiding and folding the edges of strips so as to produce tapered strips, and means for shifting said folders in timing with the shifting of the needles and the complemental stitch forming mechanism associated therewith whereby tapered strips may be formed and stitched with the lines of stitching parallel with the folded edges of the strips.

25. A sewing machine including in combination a pair of needles, means for supporting said needles whereby they may be shifted laterally relative to each other, a folder for directing the strip to said needles and folding underneath the edges of the strip, said folder being made in sections constructed so that they may be moved relative to each other, step by step, for increasing or decreasing the amount turned underneath and thereby tapering the strip, and means for simultaneously shifting the working positions of the needles and shifting the sections of the folder whereby the tapered strip may be formed and stitched with the lines of stitching parallel with the folded edges of the strip.

26. A sewing machine including in combination, two needles, complemental stitch forming devices cooperating therewith, and the folder, and mechanism whereby the positions of the needles relative to each other may be shifted and the folder may be adjusted for forming and stitching a collar strip having portions of the edges thereof extending in diverging and converging lines.

27. A sewing machine including in combination a pair of needles, complemental stitch forming devices co-operating therewith, a folding means capable of being adjusted so as to taper a strip with diverging and converging edges as it passes through the stitching mechanism, automatic means for controlling the position of the needles and for adjusting the folding means, and manually controlled means associated with said automatic means whereby the strip may be tapered and stitched at one end thereof with diverging edges, and the lines of stitching parallel therewith, then with parallel edges with the lines of stitching parallel thereto, and then with converging edges with the lines of stitching parallel thereto.

In testimony whereof, I affix my signature.

ROBERT R. HUGHES, Jr.